SELF-CLOCKING COMPLEMENTARY REDUNDANT RECORDING SYSTEM

Filed Oct. 4, 1962

3 Sheets-Sheet 1

JACK STAR
INVENTOR.

BY Nathan N. Kallman

ATTORNEY

May 16, 1967 J. STAR 3,320,598

SELF-CLOCKING COMPLEMENTARY REDUNDANT RECORDING SYSTEM

Filed Oct. 4, 1962 3 Sheets-Sheet 2

JACK STAR
INVENTOR.

BY Nathan N. Kallman

ATTORNEY

May 16, 1967 J. STAR 3,320,598

SELF-CLOCKING COMPLEMENTARY REDUNDANT RECORDING SYSTEM

Filed Oct. 4, 1962 3 Sheets-Sheet 3

MAJORITY LOGIC TRUTH TABLE

| | | | | | | | | |
|---|---|---|---|---|---|---|---|---|
| OUT | 1 | 1 | 0 | 0 | 1 | 0 | 1 | 0 |
| A | 1 | 1 | 1 | 0 | 0 | 0 | 1 | 0 |
| B | 1 | 1 | 0 | 0 | 1 | 1 | 0 | 0 |
| C | 1 | 0 | 0 | 0 | 1 | 0 | 1 | 1 |

ERROR DETECTION TRUTH TABLE

| | | | | | | |
|---|---|---|---|---|---|---|
| OUT | 0 | 1 | 1 | 1 | 0 | 1 |
| A | 1 | 0 | 0 | 1 | 0 | 0 |
| B | 1 | 1 | 0 | 0 | 0 | 1 |
| C | 1 | 1 | 1 | 1 | 0 | 0 |

JACK STAR
INVENTOR.

BY Nathan N. Kallman

ATTORNEY

United States Patent Office 3,320,598
Patented May 16, 1967

3,320,598

SELF-CLOCKING COMPLEMENTARY REDUNDANT RECORDING SYSTEM

Jack Star, San Carlos, Calif., assignor to Ampex Corporation, Redwood City, Calif., a corporation of California
Filed Oct. 4, 1962, Ser. No. 228,418
4 Claims. (Cl. 340—174.1)

This invention relates to signal recording and reproducing systems and, more particularly to systems for reliably recording and reproducing pulse code modulated data with self-clocking.

Magnetic recording techniques are now widely employed for storage and playback of many types of digital data. Such techniques are particularly useful where large volumes of data must be recorded at high speeds and with high reliability, as is necessary in business data and instrumentation applications.

Pulse code modulated information is often recorded on parallel data tracks and the reproduced data is generated under control of a separate parallel clock track. Each digital position along a magnetic tape, for example, may be precisely identified by a separate clock pulse recording. Reproduced clock pulses are used during playback to sample the digital data from the various parallel tracks, thus achieving precise time base control and permitting higher density operation.

Such systems, however, do not afford maximum accuracy and reliability because errors in any of the clock and data tracks can lead to errors in the output data. A pulse dropout in the clock track, for example, may cause loss of data digits until the clock pulses are re-established. Drop-out of data pulses themselves leads directly to errors. Redundant data recordings may be used, but do not necessarily provide adequate gains in performance. If the same data is recorded in two separate tracks, for example, a discrepancy between the data in the two tracks will only establish that an ambiguity exists, and does not resolve the ambiguity. At the same time, loss of a clock pulse may still result in an error.

It is therefore an object of the present invention to provide a digital data recording and reproducing system having improved accuracy and reliability.

Another object of the invention is to provide a system for high density storage of data at high bit rates and with high reliability.

A further object of the invention is to provide a magnetic tape recording system which can record and reproduce data at high repetition rates with improved accuracy.

These and other objects of the invention are realized by systems in accordance with the invention which utilize complementary transitional recording patterns on separate tracks. The complementary patterns are combined to provide self-clocking of the data, and also to permit error detection and correction.

A better understanding of the invention may be had by reference to the following description, taken in conjunction with the accompanying drawings, in which.

Figure 1:
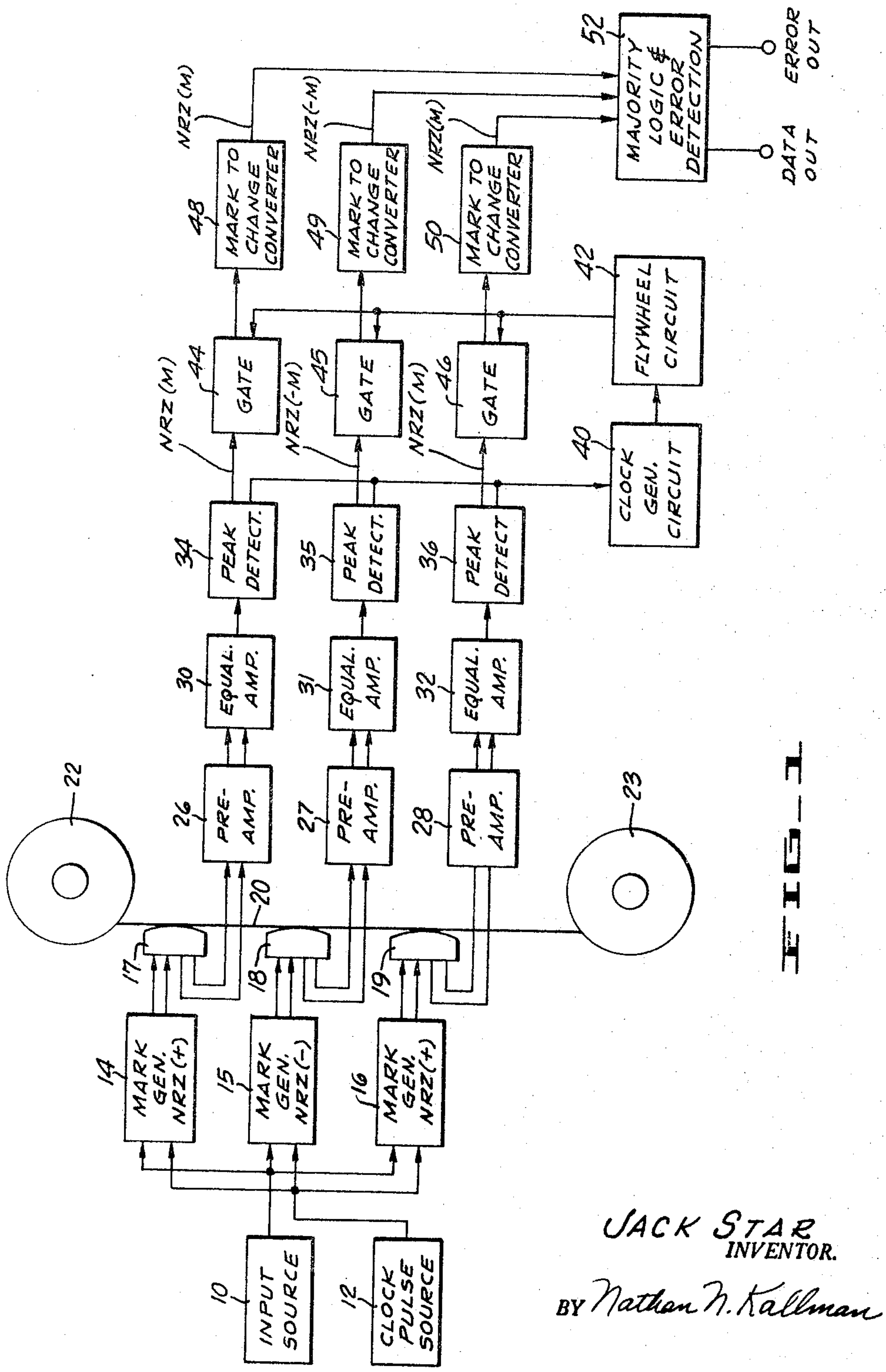
FIGURE 1 is a block diagram of a high density recording and reproducing system in accordance with the invention utilizing self-clocking circuits and majority rule logic circuits.

A specific example of a recording and reproducing system is given here in order that there may be a complete understanding of the principles of the invention. This example relates to an extremely high density (e.g. 2400 bits per inch (b.p.i.)) magnetic tape recording and reproducing system which must receive and reproduce data at very high repetition rates, such as 144,000 bits per second. Repetition rates of this order are demanded by many modern instrumentations and telemetry applications, and high density recordings are similarly required if reasonable tape speeds, such as 60 inches per second are to be maintained. Those skilled in the art, however, will recognize that the invention is also applicable to other forms of recording and other coding systems. For example, data recorded and reproduced on drum or disc systems, or by electrostatic, optical or thermoplastic techniques, may be similarly handled. The data involved is digital, but may also be recorded as wideband frequency modulated or analog signals. In a practical example the recording signal level was maintained below the level at which saturation magnetization would be obtained. Saturation recording techniques and various forms of head bias are, however, as readily available.

A specific example of a system, in accordance with the invention, utilizes three parallel recording tracks in a magnetic tape recording and reproducing system. During recording, binary digital data is recorded in two of the tracks in the non-return-to-zero (hereafter NRZ) Change format, in which one binary state (a binary "one" for example) is identified by positive-going and negative-going pulse edges, while the other binary state is distinguished by an absence of change in the signal. The remaining one of the three tracks receives a recording of the same digital data, but in a complementary NRZ code (with signal changes denoting zeros in this instance). On reproduction of the recordings from each track, pulses are generated to demarcate the transition points in the NRZ recordings. The complementary NRZ data results in a one pulse at each digital place in the recordings so that self-clocking circuits responsive to the data develop strobe pulses to sample the data in each of the three tracks simultaneously. Majority rule decision circuits responsive to the data in all of the three channels indicate the successive binary digits correctly, even if an error occurs in one track. At the same time, the presence of such an error may be detected even though the output indication is correct. Systems in accordance with the invention introduce and utilize redundancy in both the data and the clock, and thereby insure in both respects against error. In consequence they permit data to be received at extremely high rates and reproduced with very high reliability.

Input data to be recorded is derived from a source 10, which may include a sensing transducer coupled to a mechanism under observation. The signal level provided from the transducer may, in conventional fashion, be sampled at a controlled rate and binary coded signals generated in an NRZ format. Here, the NRZ Change format is initially employed, the binary "ones" being indicated by relatively higher amplitude signal levels during full pulse intervals and the binary "zeros being indicated by relatively lower signal levels. Thus, NRZ signals in this format change only when there is a transition from one binary state to the other.

The input data train in the NRZ Change format is converted in a selected fashion to the NRZ Mark form. A pulse source 12 is coupled along with the input source 10 to a group of three generators 14, 15, 16. The first and third mark generators 14, 16 provide rectangular waveforms in which leading or trailing edges of pulses denote each binary "one' value, which the intermediate mark generator 15 provides complementary signals, in that the rectangular waveform has a leading or trailing edge to denote each binary "zero" value in the input data train. Mark generators of these types are well known in the art and accordingly are not described in detail herein. Similarly, driver amplifiers for operating the record head circuits have not been illustrated but will be understood to be employed as necessary.

The signals from each of the mark generators 14, 15, 16 are applied to a different record/reproduce head 17, 18, 19 respectively. Although not shown as parallel, in order to simplify the drawing, the separate record/reproduce heads are each positioned in substantially parallel arrangement adjacent to a different recording track on a magnetic tape 20. Combination record/reproduce heads 17, 18, 19 are assumed to be used although it is well understood that separate sets of heads may be used for recording and reproduction, if desired. The tape transport mechanism, indicated only generally by a pair of reels 22, 23 will be understood to include the usual tape driving and tape guiding mechanism including speed control means as desired. It is assumed that the tape 20 is driven at a like speed, such as 60 inches per second, during both the recording and reproducing modes.

The signal reproduction system for deriving the reproduced input data is coupled to the separate record/reproduce heads 17, 18 and 19 and disposed generally in three channels corresponding to the signal recording channels. Reproduced signals are coupled through separate preamplifier circuits 26, 27, 28 and succeeding equalizing amplifier circuits 30, 31, 32 to individual peak detectors 34, 35, 36. One of the aspects of NRZ recording is, of course, that advantage is taken of the signal differentiating effect which exists when magnetic recordings are reproduced. Thus, the rate of change of flux, which is extremely high at the leading and trailing edges of the rectangular waveforms which denote selected binary values, and which is extremely low otherwise, results in the generation of positive or negative-going pulses to denote positive-going and negative-going pulse edges. Peak detector circuits 34, 35 and 36 of conventional design respond bidirectionally to these reproduced pulses to provide a substantially standard pulse of a selected single polarity for each of the input pulses.

Because of the differences in recording between the different channels, the first and third peak detectors 34, 36 provide pulses to denote each of the binary "ones" in the data, while the intermediate peak detector circuit 35 provides a pulse for each binary "zero" in the data. The pulses from all three of the channels are coupled together to actuate a clock generator circuit 40. Within the recording interval for a bit on the tape 20, one or more pulses may be applied to the clock generator circuit 40, which responds by generating a standard pulse at a selected delay after the actuating pulse. If the tape 20 is subjected to a slight skew effect as is often encountered, the pulses in the first and third channels may be out of time alignment. The clock generator circuit 40 will respond to the first pulse received within a bit interval to generate a single clock pulse within the bit interval. This clock pulse is delayed appropriately so as to be provided in the approximate center of the bit interval to insure greatest readout reliability. The ability to provide self-clocking of this nature is of great value in high density recording systems. The reliability of the self-clocking system is enhanced in this instance through the employment of a pulse interval stabilizing system, such as a flywheel circuit 42 which is coupled to receive the clock pulses from the clock generator circuit 40. The flywheel circuit 42, which may be of a conventional type, tends to provide output pulses at the repetition rate established by the pulses from the clock generator circuit 40. If, however, one or a series of clock pulses should be missed, the flywheel circuit 42 would continue to supply clock pulses until positive control was again established by the clock generator circuit 40. The data pulses from the peak detectors 34, 35, 36 are thereafter sampled at gates 44, 45, 46 under control of the pulses from the flywheel circuit 42. At this point, the data pulses in the intermediate channel are still in a coding which is complementary to that used for the data pulses in the outer channels. Pulses in all three channels are applied to separate mark-to-change converter circuits 48, 49, 50, again of conventional type. The converter 49 in the central channel, however, which receives data in the complementary code, also operates as an inverter. Thus, instead of providing a relatively high level amplitude signal to denote the "zero" states, this converter 49 provides this amplitude level to denote the binary "one" states as do the other converters 48, 50. As will be shown below, the output signals for correct data from all three of the converters 48, 49 and 50 are identical. These output signals are provided to majority logic and error detection circuits 52 which select the correct data signals with a high degree of reliability, but concurrently provide indications of the presence of ambiguities or errors.

Figure 2:
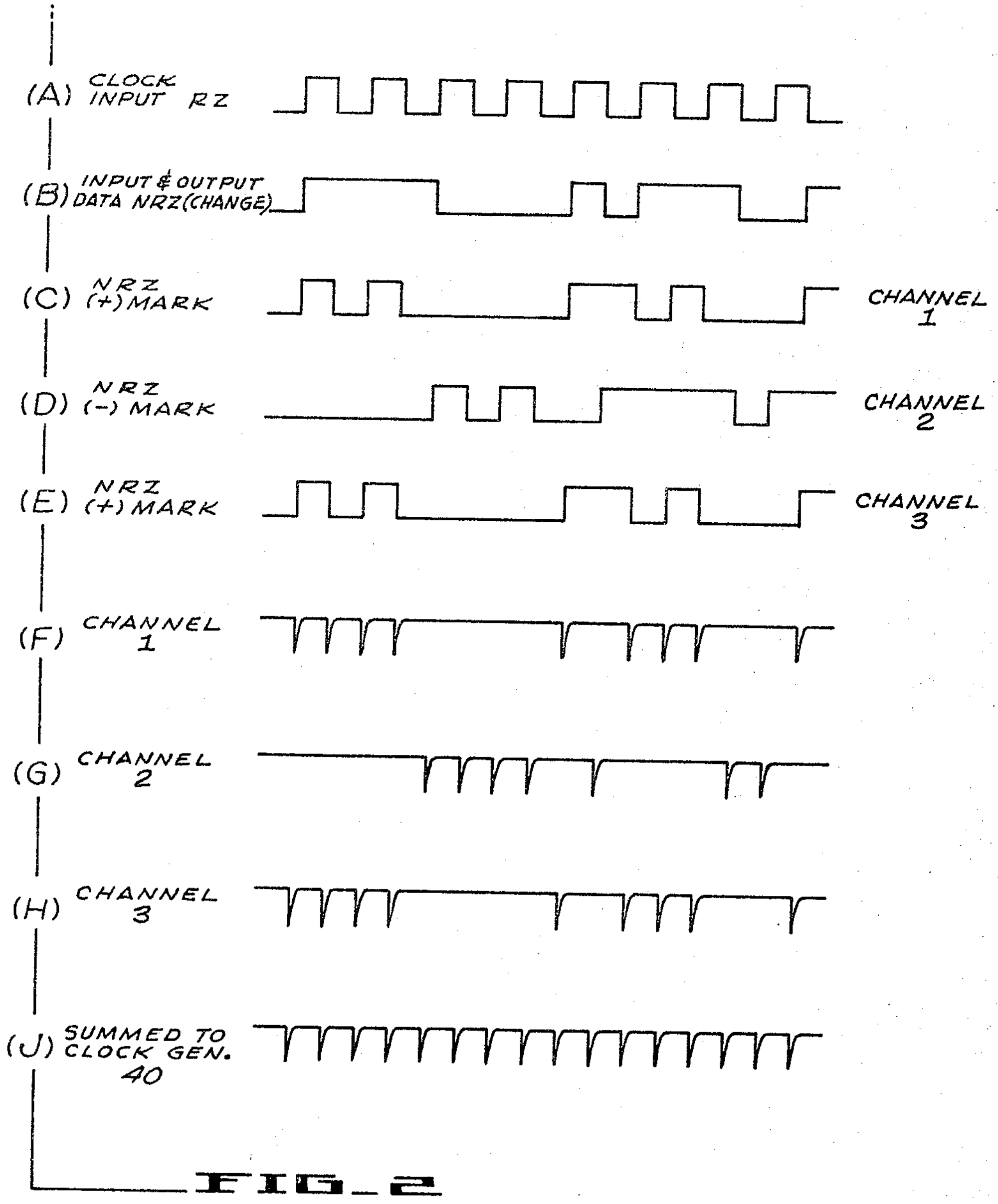
FIGURE 2 is a diagram on a time base of various waveforms occurring in the operation of the system of FIGURE 1.

A better understanding of the operation of this system may be had by reference to the representative waveforms of FIGURE 2 concurrently with the system arrangement of FIGURE 1. Clock pulses, as shown by waveform 2A, are provided from the clock pulse source 12 concurrently with the input data from the input source 10, as shown at waveform 2B. For convenience in arrangement of the mark generator circuits 14, 15 and 16, the clock signals are symmetrical rectangular waves having a repetition rate which is half that of the data rate. Thus, the clock pulses and the input data may be simply "ANDED" together in the mark generator circuits 14 and 16 to provide the NRZ Mark format in which pulse edges denote binary "ones." This format is denoted by NRZ (+) for convenience. The complementary coding, designated NRZ (−) for convenience, is generated by similar circuitry, but includes an inversion function so that transitions denote successive or individual binary "zeros," as shown by waveform 2D. Waveform 2C and waveform 2E, which represent the first and third channels, or signals provided from the outer mark generators, 14 and 16 will be seen to correspond.

Data in the NRZ (+) and NRZ (−) Mark formats are recorded in substantial parallelism in the separate three tracks on the magnetic tape by the separate record/reproduce heads 17, 18 and 19. As stated previously, these recordings are made at extremely high bit densities and at extremely high data rates, it being more important for many applications to reliably record the data at the rate at which it is presented, and to reproduce the data with virtual freedom from error despite tape imperfections, transients and the like.

The present system accomplishes these objectives through the useful redundancies which are introduced at both the data and the clock. On reproduction, the signals provided in the separate channels from the heads 17, 18 and 19 through the preamplifiers 26, 27 and 28 and equalizing amplifier circuits 30, 31 and 32 actuate the peak detector circuits 34, 35 and 36. The peak detector circuits 34 and 36 in the first and third channels provide like pulses to denote each binary "one" in the input data and thus may be said to correspond to the uncomplemented NRZ Mark code, here referred to as NRZ (M). The signal in the second channel from the second peak detector circuit 35, however, consists of the complemented format, in which like pulses denote each binary "zero" in the input data. This is shown in waveform 2G, whereas the first and third channels are shown in waveform 2F and 2H in FIGURE 2. Comparison of these waveforms reveals that a like pulse is provided during each bit interval (see FIGURE 2J) to the clock generator circuit 40, unless a dropout of a particular kind occurs. A dropout in channel 1 or channel 3, for example, has no effect because like actuating pulses are available from the other one of the channels. A dropout in channel 2 during an interval in which a binary "zero"

should be present would under other circumstances result in the loss of a clock pulse. in the present example, however, the clock pulse is not lost because the flywheel circuit 42 supplies clock pulses at the previously established repetition rate until such time as "zero" pulses are provided in channel 2 or "one" pulses are provided in channel 1 or 3. Thus the data itself is used for self-clocking, and in a fashion to take full advantage of the redundancies which are present.

The clocked signals provided from the gates 44, 45 and 46 to the mark-to-change converters 48, 49 and 50 are used to regenerate the data waveforms, corresponding to waveform 2B. Through use of well known digital circuitry, the desired NRZ change signal is reproduced. As stated previously, however, the converter 49 in the second channel includes an inverter, so that for correct data all of the waveforms which are now in the NRZ change format are alike.

Figure 3:
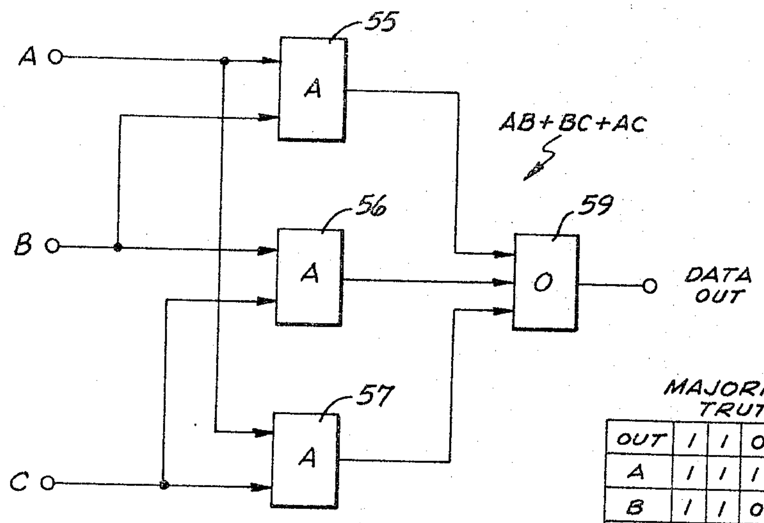
FIGURE 3 is a block diagram of majority rule logic circuits which may be employed for the similarly designated unit in the FIGURE 1 system.
Figure 4:
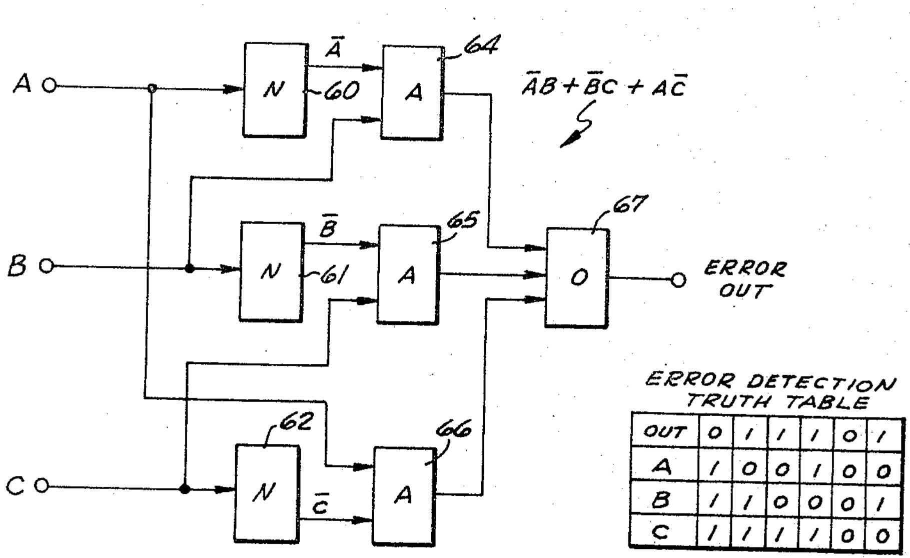
FIGURE 4 is a block diagram of error detection logic circuits which may be employed for the similarly designated unit in the FIGURE 1 system.

The presence of imperfections in the tape and other factors, of course, militate against the signals reproduced in each of the channels being exactly correct under typical operating conditions. Agglomerations of magnetic oxide may cause signal drop-in, whereas imperfect distribution of the magnetic oxide may also cause signal drop-out. Dirt, impurities and other effects may result in erroneous signals. Usually, however, these errors will be present in only one of the channels at a time. The provision of three identical signals to the majority logic and error detection circuits 52 greatly increases the system accuracy by permitting a decision as to the correct digit to be made on a reasonable basis. If all three, or if two out of three bits are concurrently indicated to be alike, the data output signal corresponding to the majority condition is indicated. If two out of three are alike, the presence of a possible error is detected and may be indicated. It is found in practice that this majority rule arrangement is satisfactorily operable, and that reliabilities of the order of 1 error in 10 bits is attained, even though as many as 20 possible errors have been indicated. In other words, signal drop-outs or drop-ins, or other aberrations, have resulted in the indication of possible errors which through the arrangement and operation of the system were effectively corrected for. The majority logic circuits may be a substantially conventional gating arrangement, such as shown in FIGURE 3. In FIGURE 3, as in FIGURE 4, "AND" gates are indicated simply by "A" and "OR" circuits are indicated by an "O." The input circuits and the three channels which are provided to the majority logic circuits are intercoupled in three different pairs to the input terminals of three different "AND" gates 55, 56 and 57. Only if like signals are present on both inputs of an "AND" gate 55, 56 or 57 will an output signal be provided to represent output data through the "OR" circuit 59. It is clear that a signal provided in one channel only is insufficient to actuate any of the "AND" gates 55, 56 or 57 so as to provide an output signal.

The error detection circuits performed the function of mechanizing the logic $\overline{A}B+A\overline{C}+\overline{B}C$. The error detection circuits include separate inverter circuits, designated "N" to indicate the negative function, each of these inverter circuits 60, 61 and 62 being coupled in a different one of the channels, designated A, B and C instead of 1, 2 and 3. The inverter circuits 60, 61 and 62 provide positive indications of the $\overline{A}$, $\overline{B}$ and $\overline{C}$ states, so that output signals provided from coupled "AND" gates 64, 65 and 66 individually indicate the presence of any one of the three different possible error combinations. The error is indicated from a common "OR" circuit 67. Because the paired combinations of input signals to the "AND" gates 64, 65 and 66 are unique, the channel in which a possible error has occurred or exists may readily be identified, if desired, by appropriate gating circuitry (not shown).

Although the three channel recording and reproducing system which is shown is particularly advantageous, it will be appreciated that the invention may also be applied to other numbers of channels. The use of only two channels, for example, affords no opportunity for majority rule logic and no redundancy in self-clocking, but does permit self-clocking and redundancy as to the data. The use of four channels with the employment of two uncomplemented format recordings and two complemented format recordings, permit substantially positive self-clocking under all conditions of operation without the use of a flywheel circuit, if desired.

While there have been described above and illustrated in the drawings various forms of high reliability, high density and high data rate recording and reproducing systems, it will be appreciated that various other alternatives, modifications and substitutions are feasible. Accordingly, the invention should be considered to include all forms falling within the scope of the appended claims.

What is claimed is:

1. A system for recording and reproducing binary digital data with high accuracy and reliability comprising:
pulse generator means responsive to the binary digital data for generating NRZ(M) coded data in a pair of data channels and NRZ(−M) coded data in a single channel, where NRZ (M) represents recording transitions for one of the binary states and NRZ (−M) represents recording transitions for the other of the binary states, such that there is at least one transition for each data position along the channels;
a number of magnetic recording means receiving the data in each of the three channels and coupled to provide parallel track NRZ recordings therefrom;
a number of magnetic reproducing means coupled to play back the parallel track NRZ recordings to provide digital data;
means responsive to the digital data from the magnetic reproducing means for generating a clock pulse for each bit period; and
majority rule logic circuit means responsive to the digital data from each of the parallel tracks and to the clock pulses for generating output binary digital data.

2. A system for recording and reproducing digital data in a non-return-to-zero format with high reliability including a self-clocking circuit comprising:
means for recording the non-return-to-zero digital data in at least two channels;
means for recording digital data in a complementary non-return-to-zero form in another channel;
means associated with each of the channels for reproducing the digital data recorded; and
differentiating means responsive to a change in signal level in any one of the three channels for generating clock pulses therefrom.

3. The system of claim 2 further including fly-wheel circuit means responsive to the generation of clock pulses for generating pulses at the frequency of the clock pulses from the differentiating means, wherein said flywheel circuit means continues to generate clock pulses in the absence of a change in signal level at said differentiating means, said flywheel circuit means being reset by the next subsequent pulse generated by said differentiating means, and wherein said system also includes means responsive to the clock pulses and the reproduced digital data for providing a single signal train constituting output data.

4. A system for recording and reproducing binary digital data with high accuracy and reliability comprising:
magnetic tape means for providing three parallel data tracks;
three magnetic head recording means for recording binary digital data in each of the parallel recording tracks;
pulse generator means responsive to the binary digital data for generating coded data in a non-return-to-zero format, the format for one of said tracks being complementary to the format used for the other two tracks;

a number of magnetic reproducing means coupled to play back the parallel track recordings to provide digital data;

differentiating means responsive to the digital data from each of the parallel track recordings for generating a clock pulse for each bit period;

separate gate means coupled to each of the magnetic reproducing means and responsive to the clock pulse for sampling the value of the digital data for each bit period; and majority rule logic circuit means responsive to the sampled digital values from each of the parallel tracks for generating output binary digital data corresponding to that produced by the pulse generator means.

References Cited by the Examiner

UNITED STATES PATENTS

| | | | |
|---|---|---|---|
| 2,628,346 | 2/1953 | Burkhart | 340—174.1 |
| 2,813,259 | 11/1957 | Burkhart | 340—174.1 |
| 2,977,578 | 3/1961 | Daniels et al. | 340—174.1 |

BERNARD KONICK, *Primary Examiner.*

A. I. NEUSTADT, *Assistant Examiner.*